Patented Oct. 31, 1922.

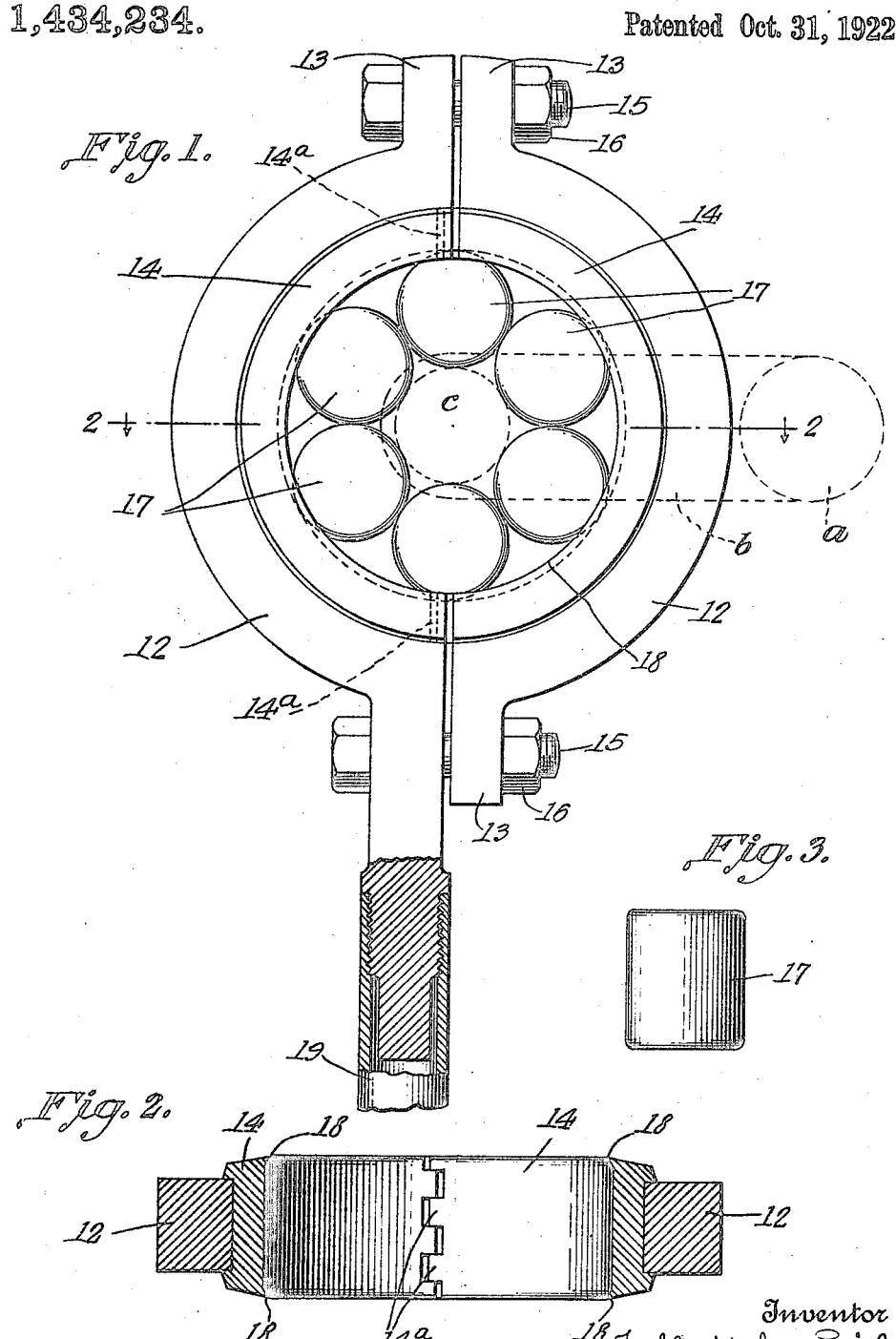

1,434,234

UNITED STATES PATENT OFFICE.

FRANKLIN HASKLIN SMITH, OF BURKBURNETT, TEXAS.

CRANK-PIN-TRUING TOOL.

Application filed April 1, 1921. Serial No. 457,808.

*To all whom it may concern:*

Be it known that I, FRANKLIN HASKLIN SMITH, a citizen of the United States, residing at Burkburnett, in the county of Wichita and State of Texas, have invented or discovered certain new and useful Improvements in Crank-Pin-Truing Tools, of which the following is a specification, reference being had therein to the accompanying drawing.

This invention has for its object to provide a tool for truing up the crank pin of a crank shaft when said crank pin may be out of true either owing to wear or for any other reason. To this end the invention comprises a two-part ring, affording a raceway, and a two-part circular yoke encircling said ring, the adjacent end faces of said ring being preferably constructed with interlocking tongues and grooves. In the raceway afforded by the said ring is a circular series of rollers, five or more in number, to surround the crank pin to be operated upon. The two parts of said yoke are held together by bolts which may be screwed up to bring the rollers into tight bearing contact with the crank pin to be trued up, and the yoke is provided with a suitable handle by which it may be oscillated back and forth with the rollers in contact with the crank pin to be trued up.

In the accompanying drawing Fig. 1 is a side view of the improved tool with the rollers in place. Fig. 2 is a section of the same on line 2—2, Fig. 1, with the rollers removed. Fig. 3 is a detail view of one of the rollers.

Referring to the drawing, 12 denotes two semi-circular parts of a yoke the adjacent end portions of which are provided with ears 13. Within the yoke 12 is a two-part ring 14 the ends of which are provided with interlocking tongues 14ª. The ring parts are preferably grooved, as shown in Fig. 2, for the reception of the yoke parts. The ears 13 have holes for the reception of bolts 15 having threaded portions for the reception of nuts 16. Within the ring 13 is arranged a circular series of rollers 17 filling the entire raceway afforded by the inner face of said ring. These rollers are preferably of hardened steel with their ends slightly rounded and the ring parts are preferably provided with flanges 18 to retain the rollers within the yoke. The yoke is provided with a handle 19 by which it may be swung back and forth with the rollers in contact with the crank pin to be trued.

In Fig. 1 a crank shaft is denoted by $a$, a crank arm by $b$ and the crank pin to be trued by $c$, these parts, not forming part of the tool, being in dotted lines.

In the use of the invention the tool is applied to a crank pin to be trued up as indicated in Fig. 1. The nuts 16 on the bolts 15 are then screwed up until the rollers 17 are tight against the crank pin $c$, and the tool is then oscillated back and forth on the crank pin to true it up, the nuts 16 being further tightened if necessary to keep the rollers 17 tight against the crank pin.

As the rollers 17 are of hardened steel they will roll down any inequalities on the crank pin without appreciably reducing the size of the crank pin or destroying its polish, and, in fact, will tend to smooth or polish the surface of the crank pins.

The yoke and ring parts will normally be slightly separated, as shown in the drawing, to provide for adjustment to bring the rollers 17 into tight bearing contact with the crank pin to be trued up and to accommodate different sized rollers to fit different sized crank pins.

Having thus described my invention I claim and desire to secure by Letters Patent:

1. A tool, for truing up a crank pin, consisting of a yoke comprising two connected parts, a two-part ring within said yoke, said ring affording a circular interior raceway, a circular series of hardened rollers fitting said raceway and adapted to tightly surround the crank pin to be trued up, said yoke being provided with a handle by which it may be oscillated back and forth on a crank pin.

2. A tool, for truing up a crank pin, consisting of a yoke comprising two connected parts, a two-part ring within said yoke, said ring affording a circular interior raceway, a circular series of hardened rollers fitting said raceway and adapted to tightly surround the crank pin to be trued, said yoke being provided with a handle, by which it may be oscillated back and forth on a crank pin, and with diametrically opposite ears, and bolts connecting said ears.

3. A tool, for truing up a crank pin, consisting of a yoke comprising two connected parts, a two-part ring within said yoke, said ring affording a circular interior raceway, a circular series of hardened rollers fitting said raceway and adapted to tightly surround the crank pin to be trued up, said yoke being provided with a handle, by which it may be oscillated back and forth on a crank pin, and with diametrically opposite ears, and bolts connecting said ears, the adjacent end portions of said ring having interlocking tongues.

4. A tool, for truing up a crank pin, consisting of a yoke comprising two adjustably connected parts, a two-part ring within said yoke, said ring affording a circular interior raceway the outer edges of which are provided with flanges, a circular series of hardened rollers fitting said raceway and adapted to tightly surround a crank pin to be trued up, said yoke being provided with a handle by which it may be oscillated back and forth on a crank pin.

In testimony whereof I affix my signature.

FRANKLIN HASKLIN SMITH.